United States Patent [19]

Posta

[11] 4,253,197

[45] Mar. 3, 1981

[54] INDICATION ASSEMBLY

[76] Inventor: Keith F. Posta, Rte. 2, Box 188D, Inverness, Fla. 33650

[21] Appl. No.: 16,727

[22] Filed: Mar. 2, 1979

[51] Int. Cl.³ ............................................ A41D 11/00
[52] U.S. Cl. ................................................ 2/69; 2/75; 2/80; 2/115; 2/227; 434/260; 434/395
[58] Field of Search .......... 2/69, 227, 80, 75, DIG. 6, 2/115, 113; 35/8 R, 29 E, 29 B, 56, 57, DIG. 1, DIG. 2

[56] References Cited

U.S. PATENT DOCUMENTS

| | | | |
|---|---|---|---|
| 2,703,404 | 3/1955 | Lawson | 2/80 X |
| 2,954,563 | 10/1960 | De Grazia | 2/DIG. 6 |
| 3,373,450 | 3/1968 | Brooks | 35/29 B X |
| 3,500,478 | 3/1970 | Foster | 2/221 |
| 3,638,334 | 2/1972 | Malikowski | 35/56 |
| 3,775,775 | 12/1973 | Mazzenga | 2/80 |
| 3,906,642 | 9/1975 | Cohen | 35/57 |
| 4,017,984 | 4/1977 | Bonfigli | 35/57 |
| 4,095,299 | 6/1978 | Schweiso | 2/80 X |
| 4,096,647 | 6/1978 | Barry | 35/56 |

Primary Examiner—H. Hampton Hunter
Attorney, Agent, or Firm—Arthur W. Fisher, III

[57] ABSTRACT

An indication assembly of the type used to facilitate the teaching of relatively young children and persons of limited learning ability to dress themselves with limited instruction comprising the use of wearing apparel or garments which include a plurality of indication elements affixed thereto. Each of said indication elements is disposed on an exposed surface portion of the garment and being structured to include visual indicia arranged in predetermined sequence so as to accomplish presentation of visual cues for proper sequence of holding the particular garment for placing the garment on the body.

6 Claims, 3 Drawing Figures

INDICATION ASSEMBLY

BACKGROUND OF THE INVENTION

1. Field of the Invention

An indication assembly for facilitating a method of teaching relatively young children and persons of limited learning ability to dress themselves with limited instructions utilizing the placement of predetermined indicia, in varying forms, at predetermined locations on the garment to be placed on the body.

2. Description of the Prior Art

It is of course common knowledge that children of relatively young ages as well as certain other physically and mentally handicapped individuals have great difficulty learning how to properly dress themselves, either in whole or in part in the normal manner. With younger children efforts utilized in teaching proper methods of dressing often become extremely frustrating both to the child and to the parent or guardian attempting to teach such dressing or clothing techniques. Also younger children more frequently have to dress and undress or at least partially remove various garments from their body during the period when the child is being toilet trained. It is generally the custom for the child to at least partially disrobe but have great difficulty in accomplishing proper placement of the garments or clothing on the body in the correct manner after such disrobing.

In order to solve such problems enumerated above numerous garments have been structured to facilitate dressing, coordination and the like to render dressing more efficient and require generally less supervision.

In particular the U.S. Pat. Nos. set forth hereinafter are generally directed to solving such efforts. Mazzenga, 3,775,775; Cariffe, 3,258,858; Cookman, 2,923,009; Foster, 3,500,478; and Killeen, 2,617,991.

While the structures disclosed in each of the above set forth patents are directed to the accomplishment of certain functions, in a more efficient manner, generally associated with the dressing of individuals, none are specifically directed towards the teaching of young children or persons of limited learning ability methods associated with the correct manner of dressing. More specifically numerous of such patents disclose structures which are primarily designed to facilitate opening and closing of certain portions of the garments or the coordinating or matching of certain garment combination in order to provide a more esthetic appearance of the dressed person.

The principal objective of this invention is to provide a device which teaches children a sequential order for putting on a garment.

Another objective of this invention is to provide children with visual cues for positioning the hands when putting the garment on.

One more objective is to use a set of simple and decorative indicia affixed to the garment.

SUMMARY OF THE INVENTION

In overcoming the problems set forth above which are associated with the dressing of small children, by themselves, the present invention in directed towards the inclusion of an indication assembly. Such indication assembly comprises a plurality of indication means or indication elements disposed on the outer surface of any given garment in predetermined spaced apart relation to one another.

Each of the indication elements are sequentially positioned and comprise some type of indicia which is visible to the person or individual attempting to place the garment on his own body. By the term "indicia" the structure of the present invention is meant to include a plurality of sequentially arranged numbers, letters of the alphabet, or a color coded arrangement recognizable to the individual attempting to place the garment on his own body.

An important structural feature of the present invention is the placement of the individual indication elements or means at what may be considered sequential locations corresponding to the positions on the garment where the individual would normally hold or grasp the garment while positioning or placing the garment on his body.

The indication assembly of the present invention further comprises a reference means in the form of some type of table, or chart which may be referred to by the individual to determine proper sequence of grasping prior to such sequence being memorized or previously taught.

The invention accordingly, comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present relates to an indication assembly including a plurality of indication means which facilitates a method of teaching relatively young children and persons of limited learning ability to dress themselves with limited instruction, and assistance. The process and procedure of dress oneself is a relatively complicated procedure requiring proper sequential acts in combination with proper motor responses. As a result young children learning to dress themselves often become frustrated with the clothing. For example while putting on a pair of pants or trousers various problems may be encountered such as:

(1) Once the pants are over the feet the child finds it hard to pull them up to the waist.

(2) When the pants are pulled over the hips the waistband rolls under the pants.

(3) Many time the pants are put on backwards.

With snap and zipper closure pants children have the problems of:

(1) Holding the waistband correctly to pull the pants up.

(2) Matching and pressing the snap while holding the waistband.

(3) Finding the end of the zipper and pulling it up. Besides the child's frustration the parents become frustrated too and end up dressing or at least partially dressing them. With the problems and frustrations it becomes apparent that teaching a child to dress may be a discouraging and a lengthy learning experience.

In addition to pants the invention could be used with any garment that the hands have to move from one position to another position to complete pulling on the garment.

These objectives are attained when a set of indicia are affixed to the garment on an exposed outer surface thereof generally in the area where the positions of the hands hold, grasps, or pull the garment. The set of indicia are sequentially disposed on each garment, corresponding with the position of the hands as they move from one step to another. Thus when a child has a problem holding the garment in the correct position for starting to put on the garment he need only grasp the first sequential indicia and he will be holding the garment in a correct position, or if a child does not know what to do next he only has to refer to the next sequential indicia.

Figure 1:
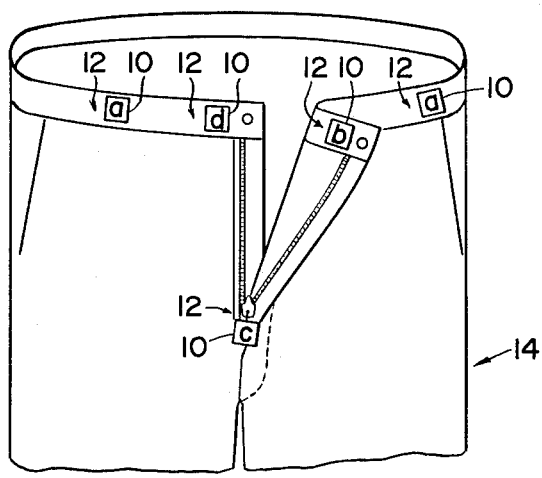
FIG. 1 is a front view, partially cutaway showing one particular garment including a plurality of the indication elements formed thereon.
Figure 2:
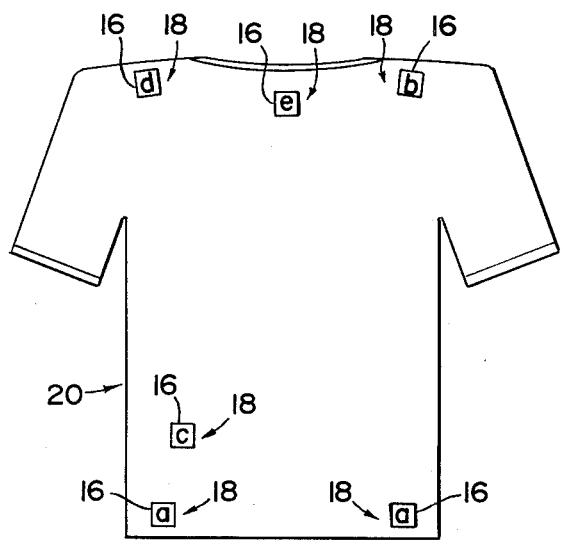
FIG. 2 is another garment of different type than the embodiment of FIG. 1 with the indication elements formed thereon.

The use of these sequential indicia are best understood with reference to FIGS. 1 and 2.

FIG. 1 illustrates a plurality of indication means of elements 10 mounted on exposed surface portions 12 of a pair of pants 14 to create a texture cue. FIG. 2 similarly illustrates a plurality of indication elements 16 on surface portions 18 of a garment 20 in the form of a T-shirt. Furthermore each indication element 10 or 16 has predetermined indicia formed thereon, wherein the indicia is arranged in a predetermined sequence.

The positioning and order of the indicia does not have to be the same as shown in FIGS. 1 and 2 because there are many different ways to put on the same garment. The intentions of this invention is to give visual cues and a sequential order of operation by using indicia and not to develop a specific way to put on the garment.

Figure 3:
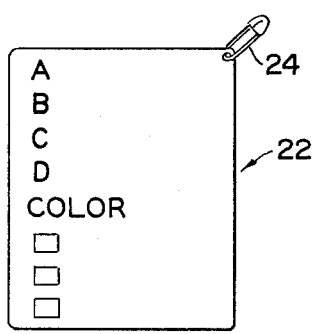
FIG. 3 is a reference means which may or may not be attached to the garment and generally placed in the vicinity thereof to provide a proper reference and explanatory information in utilizing the proper sequence of the indication elements.

The sequentially arranged indicia alone is not enough to teach a child to dress himself. The indicia will cue the child to hold the garment in a correct position and what position the hands will move to for the next hand position. The child would still need to know the motion of the hands once they have correct position. This can be accomplished by using a reference means 22 (FIG. 3). This reference means 22 may be in the form of a tag attached to the garment by a connector 24. The tag 22 gives directions or instructions. For example the directions for pants would read:

a—pick up pants and pull to waist
b—grasp and hold pants while doing c.
c—pull up zipper
d—hold, match and snap Directions for T-shirt would read:
a—hold, with both hands, then put right arm in the sleeve
b—with left hand pull sleeve up the arm
c—with right hand grasp and put left arm in sleeve
d—with right hand pull sleeve up arm
e—use both hands and pull over head It should be noted that the predetermined set of visual indicia are disposed to represent the proper physical positioning of the hands while at the same time they oriented with respect to the horizontal and vertical axis to provide the proper orientation of the garment to the person itself. Moreover, the predetermined set of visual indicia which represent the plurality of cues for the proper sequence of operative steps represent a normally learned sequence such as letters a, b, c or numerals 1, 2, 3. Alternately, the indicia could be a predetermined color coding.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. An indication assembly of the type primarily designed to facilitate the placing of clothing on the human body, said indication assembly comprising: at least one garment, a plurality of indication means mounted on said garment at predetermined spaced apart locations from one another, each of said indication means disposed at a location substantially corresponding to a position on said garment normally grasped by one while donning said garment, each of said indication means further disposed for substantially sequential grasping by one donning said garment, each of said plurality of indication means comprises indicia mounted thereon, said indicia configured to represent a predetermined sequential cue point, whereby teaching one to dress through utilization of said plurality of indication means is facilitated.

2. An indication assembly as in claim 1 further comprising reference means disposed in the accessible, vicinity of said garment, said reference means comprising explanatory information relative to said cue points and sequential utilization of said plurality of indicia.

3. An indication assembly as in claim 2 wherein said plurality of indication means are colored coded, and said reference means comprise a predetermined arrangement of said indication means relative to said colored coded arrangement.

4. An indication assembly as in claim 1 wherein said plurality of indication means comprises a number of indication elements mounted on a predetermined outer, exposed surface portion of said garment, each of said indication elements visually accessable and including predetermined sequentially coded indicia formed thereon.

5. An indication assembly as in claim 4 wherein said sequentially coded indicia comprises sequentially arranged letters of the alphabet.

6. An indication assembly as in claim 4 wherein said predetermined sequentially coded indicia comprises a plurality of numbers each of said numbers mounted on different ones of said indication elements.

* * * * *